(12) United States Patent
Engel et al.

(10) Patent No.: US 8,023,288 B2
(45) Date of Patent: Sep. 20, 2011

(54) INVERTER FOR GROUNDED DIRECT CURRENT SOURCE, MORE SPECIFICALLY FOR A PHOTOVOLTAIC GENERATOR

(75) Inventors: Bernd Engel, Wolfenbüttel (DE); Regine Mallwitz, Kassel (DE); Peter Zacharias, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 583 days.

(21) Appl. No.: 12/218,018

(22) Filed: Jul. 10, 2008

(65) Prior Publication Data
US 2009/0034304 A1 Feb. 5, 2009

(30) Foreign Application Priority Data
Aug. 4, 2007 (EP) .................................. 07015324

(51) Int. Cl.
*H02M 3/335* (2006.01)
(52) U.S. Cl. .......................................... 363/17; 363/37
(58) Field of Classification Search .................... 363/15, 363/16, 17, 34, 37
See application file for complete search history.

(56) References Cited

U.S. PATENT DOCUMENTS

| | | | |
|---|---|---|---|
| 7,512,422 B2 * | 3/2009 | Coleman | 455/572 |
| 2004/0164557 A1 | 8/2004 | West | |
| 2004/0165408 A1 | 8/2004 | West et al. | |
| 2007/0047277 A1 | 3/2007 | Konishi et al. | |
| 2008/0231211 A1 * | 9/2008 | Baarman et al. | 315/294 |
| 2009/0034304 A1 * | 2/2009 | Engel et al. | 363/71 |
| 2010/0008105 A1 * | 1/2010 | Mallwitz et al. | 363/16 |
| 2011/0002445 A1 * | 1/2011 | Hattrup et al. | 378/101 |

FOREIGN PATENT DOCUMENTS

| | | |
|---|---|---|
| DE | 19642522 | 4/1998 |
| DE | 19732218 | 3/1999 |
| DE | 10221592 | 12/2003 |
| DE | 10225020 | 12/2003 |
| DE | 102004030912 | 1/2006 |
| DE | 102004037446 | 6/2006 |
| DE | 102005023291 | 11/2006 |
| DE | 102005046379 | 4/2007 |

* cited by examiner

*Primary Examiner* — Jeffrey L Sterrett
(74) *Attorney, Agent, or Firm* — Eschweiler & Associates, LLC

(57) ABSTRACT

An inverter (1) for a grounded direct voltage source, in particular for a photovoltaic generator (2), a battery or a fuel cell, for converting the direct voltage into an alternative voltage with a DC-DC converter (3) and a pulse inverter that is supplied by said DC-DC converter (3), said DC-DC converter (3) being configured to be an oscillating circuit inverter and comprising a series resonant oscillating circuit, said DC-DC converter (3), which is configured to be an oscillating circuit inverter, being configured to be a series-compensated oscillating circuit inverter with a choke (L1) and a series-mounted capacitor array consisting of two or several oscillating circuit capacitors, a rectifier bridge branch including 2 diodes (D3, D4; D5, D6, . . . ), being connected to each of the partial oscillating circuit capacitors, said rectifier bridge branch being connected with its positive or its negative pole to output side intermediate circuit capacitors which are preferably connected in series so that said DC-DC converter (3) delivers at least two bipolar output voltages and is combined with the pulse inverter (4) with a divided voltage intermediate circuit that is supplied from the oscillating circuit inverter.

17 Claims, 7 Drawing Sheets

INVERTER FOR GROUNDED DIRECT CURRENT SOURCE, MORE SPECIFICALLY FOR A PHOTOVOLTAIC GENERATOR

CROSS-REFERENCE TO RELATED APPLICATIONS

This application claims Priority from German Application No. EP 07015324.2 filed on 4 Aug. 2007

FIELD OF THE INVENTION

The invention relates to an inverter for a grounded direct voltage source, in particular for a photovoltaic generator, a battery or a fuel cell, for converting the direct voltage into an alternating voltage with a DC-DC converter and a pulse inverter supplied by the DC-DC converter.

Unavoidable parasitic capacitances occur on photovoltaic generators. If high-frequency clocked pulse inverters are being utilized for converting the generator's direct current into an alternating voltage at mains frequency, considerable, in parts not tolerable AC leakage currents can flow to ground from the photovoltaic generator.

Great potential jumps at mains frequency can also lead to AC leakage currents because of their steep increase in voltage.

DESCRIPTION OF THE PRIOR ART

From the document DE 10 2004 037 446 A1 a transformerless inverter for solar grid supply is known that is intended to eliminate the problem of capacitive leakage currents at the solar generator, these leakage currents being capable of damaging solar cells on the one side and of letting hazardous contact voltages of the solar panels occur. The not grounded solar generator is connected to a grounded pulse-width controlled inverter that delivers a symmetrical +/− voltage related to earth potential. A symmetrical direct voltage boost converter having one single switch is utilized so that, beside the switches of the pulse inverter, only one additional switch is needed. Through the low number of switches, switch losses are low but since the circuit needs absolutely symmetrical component parts such as chokes and capacitors, which is difficult in practical use, capacitive leakage currents can only be minimized but not completely avoided. Another disadvantage is that it is not possible to directly ground the solar generator.

The document DE 102 21 592 A1 proposes a method for converting a direct voltage of a photovoltaic plant into an alternating current. Between the connection lines on the grid side there are provided two separate connection paths in each of which there are provided a switch as well as a diode connected in series. As a result, the efficiency is intended to improve since no power losses connected with power backfeeding into a buffer capacitor can occur. It is not possible to ground the generator with this circuit.

The document DE 10 2004 030 912 B3 describes a method of converting a direct voltage of a photovoltaic generator into an alternating voltage by which the alternating voltage circuit is decoupled from the direct voltage circuit by means of a switch. As a result, high-frequent interferences due to clock process are avoided. Direct grounding of the generator is also not possible. Like in the previous circuits, the solar generators are operated isolated from the grid in certain phases of internal power transport. During the periodically renewed electrical connection of the solar generator to the grid, its capacitances are however slightly recharged so that the potential of the solar generator changes with utility frequency. Accordingly, between two switching processes and through asymmetries during switching, voltage differences form, which result in capacitive leakage currents.

In principle, capacitive leakage currents can only be completely avoided if the potential of the photovoltaic generator is fix with respect to ground potential, i.e., if the generator is directly grounded. A circuit with a photovoltaic generator grounded at the negative pole is discussed in U.S. Pat. No. 7,064,969 B2. This circuit includes an inverter circuit with a grounding point formed between two capacitors. One disadvantage is that the switches used are very much stressed because of the circuit array needed. In this circuit, a parallel circuit consisting of a buffer capacitor and a dual boost converter is connected downstream of the grounded solar generator. The solar generator charges the buffer capacitor depending on the available solar energy. The dual boost converter charges a second capacitor. Downstream of the two capacitors, which are connected in series, there is connected a bridge configuration that provides a sinusoidal alternating voltage for feeding into a utility grid through a mains filter consisting of a choke and a capacitor. The dual boost converter allows for charging the second half-bridge capacitor to the same voltage as provided for the buffer capacitor for positive voltage. For this purpose, the inverting dual boost converter is operated with a fix voltage transformation factor of −1 for example. As a result, the actual solar generator voltage can be double, related to the intermediate circuit voltage. The voltage, at least at the first capacitor, thereby corresponds directly to the output voltage of the solar generator. In order to operate the solar generator in the maximum power point, the energy transfer into the utility grid must be accordingly controlled with the connected inverter.

The disadvantage of this circuit is that the solar generator voltage is coupled directly to the intermediate circuit voltage. The MPP voltage of a solar generator, which fluctuates in wide ranges, must therefore always be greater than the highest possible peak value voltage of the utility grid. Moreover, hard switching and intermediate magnetic storage of energy lead to high losses and large-sized passive components.

Grounding is also possible in the circuit according to US 2007/0047 277 A1, the switches being also highly loaded. For two dual boost converters with only one switch, the DC/AC converter, which can be configured to be a one-phase or a three-phase full or half-bridge, are connected upstream thereof. The fact that the chokes of the dual boost converters are built identically on a core reduces to a large extent relevant asymmetries. The use of only one switch for the two dual boost converters forcibly leads to higher load of said switch during switching operation.

Grounding is also provided in the circuit according to DE 197 32 218 C1. In this document, a converter circuit is proposed, which avoids the disadvantage of the capacitive output filter. However, it requires up to nine active switches of which at least two switch simultaneously at high frequency. This negatively affects both the robustness and the efficiency of this connection to a considerable extent.

An inverter according to DE 196 42 522 C1 comprises a circuit array with several switches that are triggered by a microcontroller for generating a complicated switching pattern.

In this solution, a circuit with simple grounded solar generator is described, which prevents capacitive leakage currents as a matter of principle. The circuit contains five active switches, one or two switches, which switch simultaneously at high frequency, providing the mean output current. The disadvantage of this circuit is that intermittent current pulses are impressed upon the grid, said pulses requiring a capacitive grid filter which, as a matter of principle, degrades not only the power factor but also the efficiency of the circuit in the part load range due to its own idle power need. Moreover, with this circuit, the efficiency is adversely affected due to the great number of components participating concurrently in series in the current flow.

Further solutions are known, which can be considered to belong to what is known as string technology. In DE 102 25 020 A1, DE 10 2005 046 379 A1 and U.S. Pat. No. 7,099,169 B2, circuit arrays are described, which consist of a divided solar generator the center point of which is grounded. As a result, all the parts of the solar generator have a fix potential and capacitive leakage currents cannot flow in principle. Since the two direct current sources have a different yield or can generate different voltages, a circuit is needed to compensate for the power differences and the voltages, as proposed in the document DE 102 25 020 A1. The disadvantage of these circuit proposals are the high voltage differences in the solar generator and at the switches as well as the additional losses in the compensation circuit and the at least four switches clocked at high frequency.

Another problem that has not been solved yet is that photovoltaic generators degrade very differently, depending on which pole they are grounded and on which technology was used for making them. Accordingly, generators with crystalline and polycrystalline cells are preferably grounded with the negative terminal whilst thin film modules with backside contact are preferably grounded at the positive terminal. A circuit array is desirable, which allows for the two variants and also for grounding to an artificial, e.g., central grounding point so that three grounding variants in all are possible.

An inverter is known from DE 10 2005 023 291 A1; downstream of its DC input, a boost converter and a resonance converter are connected, with a transformer, a resonance capacitor and a resonance choke.

BRIEF SUMMARY OF THE INVENTION

The object of the invention is to provide an inverter by means of which capacitive leakage currents are prevented at little expense in terms of wiring and that allows for little load on the switches.

This object is solved by an inverter of the type mentioned herein above, the DC-DC converter, which is formed as an oscillating circuit inverter, being implemented as a series-compensated oscillating circuit inverter with a choke and a capacitor array connected in series and consisting of two or more oscillating circuit capacitors, a rectifier bridge branch including 2 diodes being connected to each of the partial oscillating circuit capacitors, said rectifier bridge branch being connected with its positive or negative pole to output side intermediate circuit capacitors which are connected in series so that the DC-DC converter delivers two bipolar output voltages and is combined with the pulse inverter with a divided voltage intermediate circuit that is supplied from the oscillating circuit inverter.

The invention allows for a circuit array with high efficiency thanks to minimum switching losses in the DC-DC converter. The DC generator is allowed to have a fix potential with respect to ground. Moreover, it is possible to feed a continuous current into the utility grid. Additionally, any grounding of the photovoltaic generator can be achieved. HF leakage currents of the photovoltaic generator or of another direct voltage generator are avoided. The invention further allows for high efficiency also in part load range as well as a small size for the energy stores in the DC-DC converter because a potentially high switching frequency.

Thanks to the invention, the DC source can in principle be grounded at the positive or at the negative pole, or symmetrically with respect to GND.

The invention relies on the basic idea of a combination of a DC-DC converter with two bipolar output voltages, which supply a pulse inverter with a divided voltage intermediate circuit.

An advantage of the DC-DC converter utilized in accordance with the invention is that, in particular thanks to a series resonance oscillating circuit with divided oscillating circuit capacitor, the participating switches are relieved to a large extent from switching losses on the one side and two voltage intermediate circuits which are charged on two poles with respect to ground are supplied sufficiently symmetrically on the other side. As a result, current can be fed into a one-phase grid related to earth or into a 3-phase grid with earthed neutral thanks to a pulse inverter connected downstream thereof. Thanks to the particular topology of the circuit, the photovoltaic generator side and the grid side are separated in terms of direct current. This galvanic isolation is achieved by preferably two or even more oscillating circuit capacitors. Since these capacitors absorb the DC difference voltage between the photovoltaic generator side and the constituent parts of the direct voltage intermediate circuit of the inverter, it is possible to ground the photovoltaic generator both with its negative terminal and with its positive terminal.

In accordance with the invention, there is provided that the oscillating circuit inverter is configured to be a series-compensated oscillating circuit inverter with a choke and a capacitor arrangement connected in series. By applying the principle of a series compensated oscillating circuit inverter, the switch-off losses of the active switches are almost completely eliminated. Depending on the control method, the switch-on losses of these switches and the commutation losses of the diodes can also be avoided in practice. For this purpose, one allows the current to be intermittent or to only overlap slightly so that the current steepness is limited by the very oscillating circuit during switching. In this way, switch-on losses are avoided to a large extent and switch-off losses of active switches, almost completely.

The voltage intermediate circuit is divided in accordance with the invention by the fact that at least two parallel oscillating circuit capacitors are provided, which are connected to the oscillating circuit choke. As a result, the current flow is divided into at least two paths. For the current to be sufficiently evenly distributed to the capacitors, the associated parallel oscillating circuit capacitors have the same capacitance.

The efficiency can be further improved by bridging the secondary active rectifier diode in its conducting phase with an also conductive FET.

Both crystalline and polycrystalline cells and thin film cells can be grounded in a suited way if, in accordance with a preferred embodiment of the invention, two series-connected capacitors are provided on the intermediate circuit, in parallel with the direct voltage source, a grounding point optionally lying either between the capacitors or on a positive pole of the source, the capacitor being mounted at the positive pole being bridged or lying at a negative pole of the source, in which case the capacitor mounted at the negative pole is being bridged.

Further advantageous implementations of the invention are recited in the dependent claims.

An exemplary embodiment will be discussed with reference to the drawings, further advantageous developed implementations of the invention and advantages thereof being described. In said drawings:

DETAILED DESCRIPTION OF THE INVENTION

Figure 1:
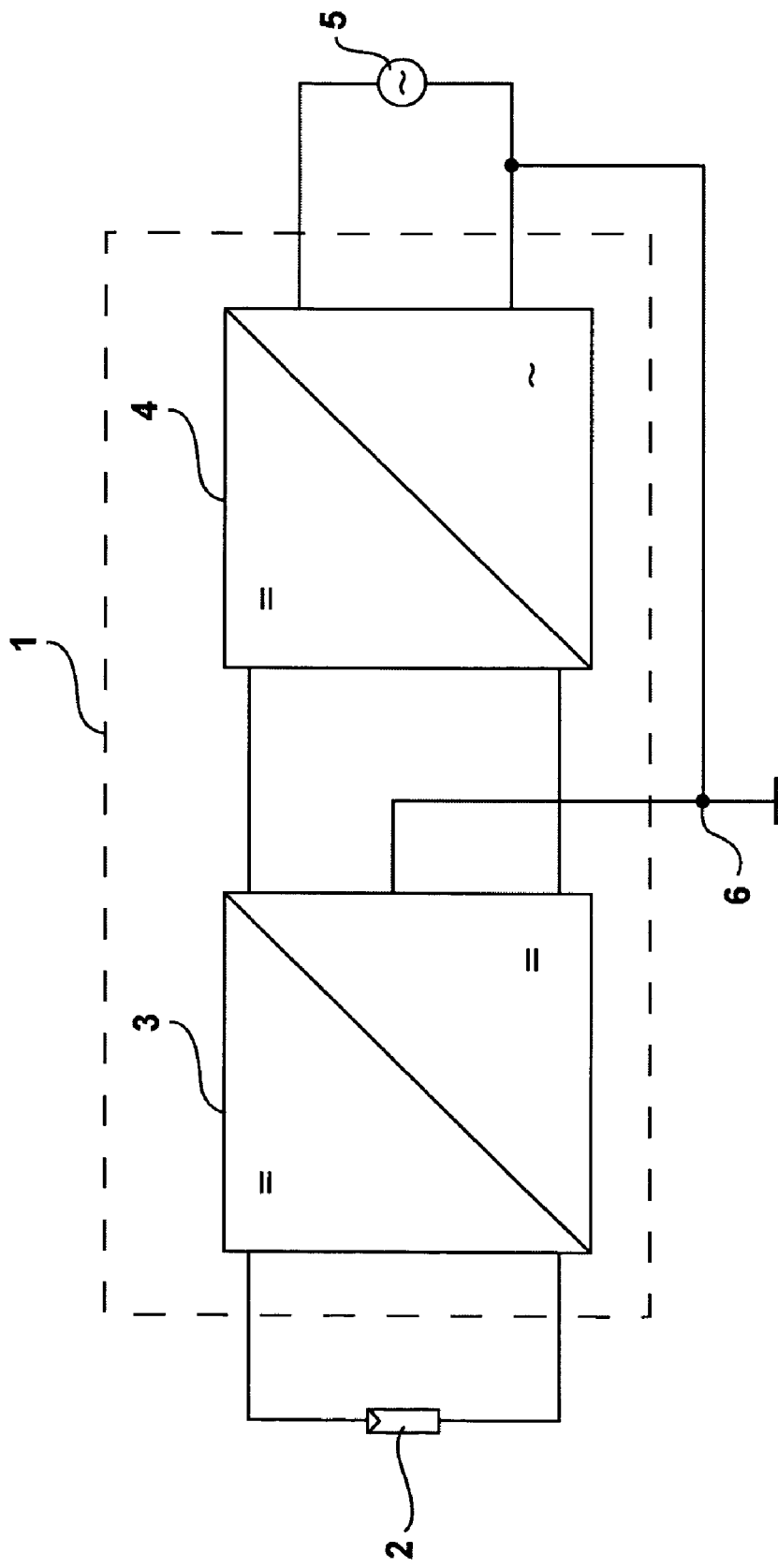
FIG. 1 shows a schematic diagram of the inverter of the invention.

FIG. 1 shows a schematic diagram of the inverter 1 of the invention. A DC-DC converter 3 is connected downstream of a DC source, which is shown in FIG. 1 in the form of a photovoltaic generator 2. This DC-DC converter 3 supplies a DC-AC converter 4 the output of which is connected to a utility grid 5 and serves for feeding into said utility grid 5. The DC-DC converter 3 is thereby configured so as to allow for grounding both the DC source 2 and the grid 5 to a grounding point 6.

Figure 2:
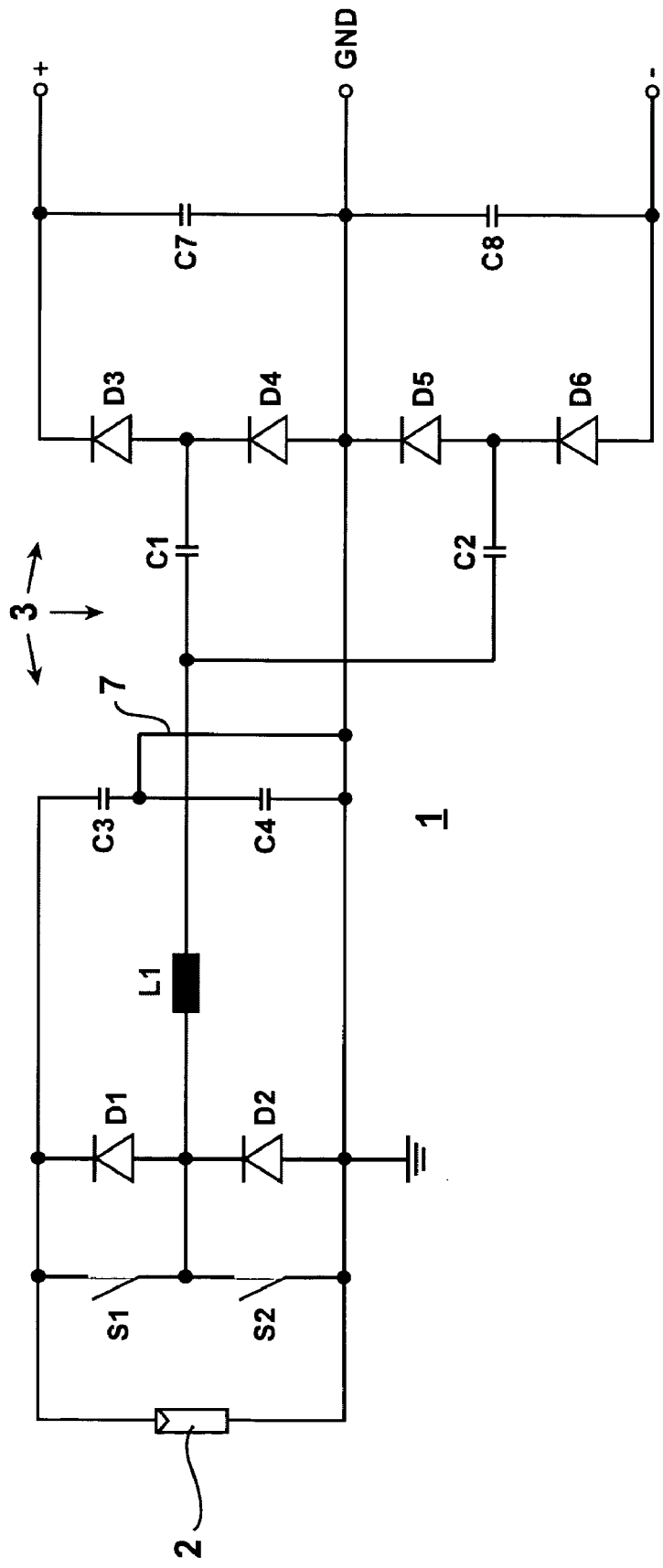
FIG. 2 shows a first exemplary embodiment of the DC-DC converter stage of the inverter of the invention in which a negative generator pole is grounded.

FIG. 2 shows a DC-DC converter 3 of the inverter 1 of the invention, which consists of the switches S1 and S2 with the respective anti-parallel diodes D1 and D2 which are switched on alternately, with the oscillating circuit inductivity L1, which can be implemented as a concentrated component part or as an assembled component part, with the two prorated oscillating circuit capacitors C1 and C2 as well as with the two rectifier branches. Each rectifier branch consists of two diodes. The first rectifier consists of the diodes D3 and D4, the second rectifier of the diodes D5 and D6. The capacitors C3 and C4, which are connected in series, correspond to the buffer capacitor usually connected downstream of the DC source, here the solar generator (2).

Through the described and illustrated wiring, symmetrical output voltages are generated at the intermediate circuit capacitors C7 and C8 with respect to ground if the dimensions are symmetrical and the load is symmetrical, said output voltages then being input voltages for generally known inverters 4 with voltage intermediate circuit for feeding into the grid or for the construction of an island network in a one or multiple phase implementation. This means that a generally known DC-AC converter 4 is connected downstream of the capacitors C7 and C8, e.g., in a full or half-bridge circuit in a one or multiple phase implementation.

As shown in FIG. 2, the DC-DC converter 3 is implemented as an oscillating circuit inverter. The oscillating circuit consists of a choke L1 and of a capacitor array with the capacitors C1 and C2. These form a series resonant oscillating circuit, resulting in a series-compensated oscillating circuit inverter. Through the half-bridge inverters, which consist on the one side of the diodes D3 and D4 and on the other side of the diodes D5 and D6, a direct voltage is built up at a respective one of the capacitors C7 and C8.

The illustrated capacitors C7 and C8 represent the divided DC intermediate circuit of the pulse inverter connected downstream thereof.

The DC-DC converter 3 has two series-connected semi-conductor switching elements S1, S2. They are connected in parallel to the generator 2. Between the switching elements S1, S2, there is the choke L1. Depending on which of the switches is closed, an oscillating process with positive current (S1 closed) or with negative current (S2 closed) starts through L1. Accordingly, the oscillating circuit consisting of the choke L1 and the capacitor array C1, C2 is connected at the connection point of the semi-conductor switches S1, S2 so that a positive and negative output current can flow through alternate switching of the semi-conductor switches.

The semi-conductor switches S1, S2 are clocked at high frequency. Only one respective switch S1 or S2 is closed.

If switch S1 is closed, a current flows through the capacitor C1 and the diode D3 as well as through the capacitor C2 and the diode D5. If the polarity of the oscillating circuit current is changed thereafter, the diodes D4 and D6 become conductive whilst the diodes D3 and D5 lock. Upon a change of polarity, the switch S1 opens and the current only flows through diode D1. If at the end or after the conducting phase of D1 the switch S2 is closed, a current flow starts through the choke L1 in the same polarity as during the conducting phase of D1 so that the diodes D4 and D6 are supplied with current through the capacitors C1 and C2 until, when the polarity of the oscillating circuit current changes again, the diodes D3 and D5 are conductive whilst the diodes D4 and D6 lock.

Through the diodes D4 and D5, a charge equalization of the capacitors C1 and C2 is not possible so that the desired division of the currents for the intermediate circuit capacitors C7 and C8 can occur. The oscillating circuit capacitors C1, C2 have the same capacity so that the current is symmetrical.

Through the oscillating circuit capacitors C1 and C2, the discrete ""load circuits" of the positive and negative part of the voltage intermediate circuit for direct current are isolated from each other. As a result, different voltage levels can be operated. The current circuit must only be closed to the high frequency load currents.

Two series-mounted capacitors C3, C4 are connected in parallel to the generator 2. The capacitor C4, which is mounted at the negative pole, is short-circuited with the line 7. Accordingly, the variant shown in FIG. 2 allows for grounding the generator at its negative pole.

Figure 3:
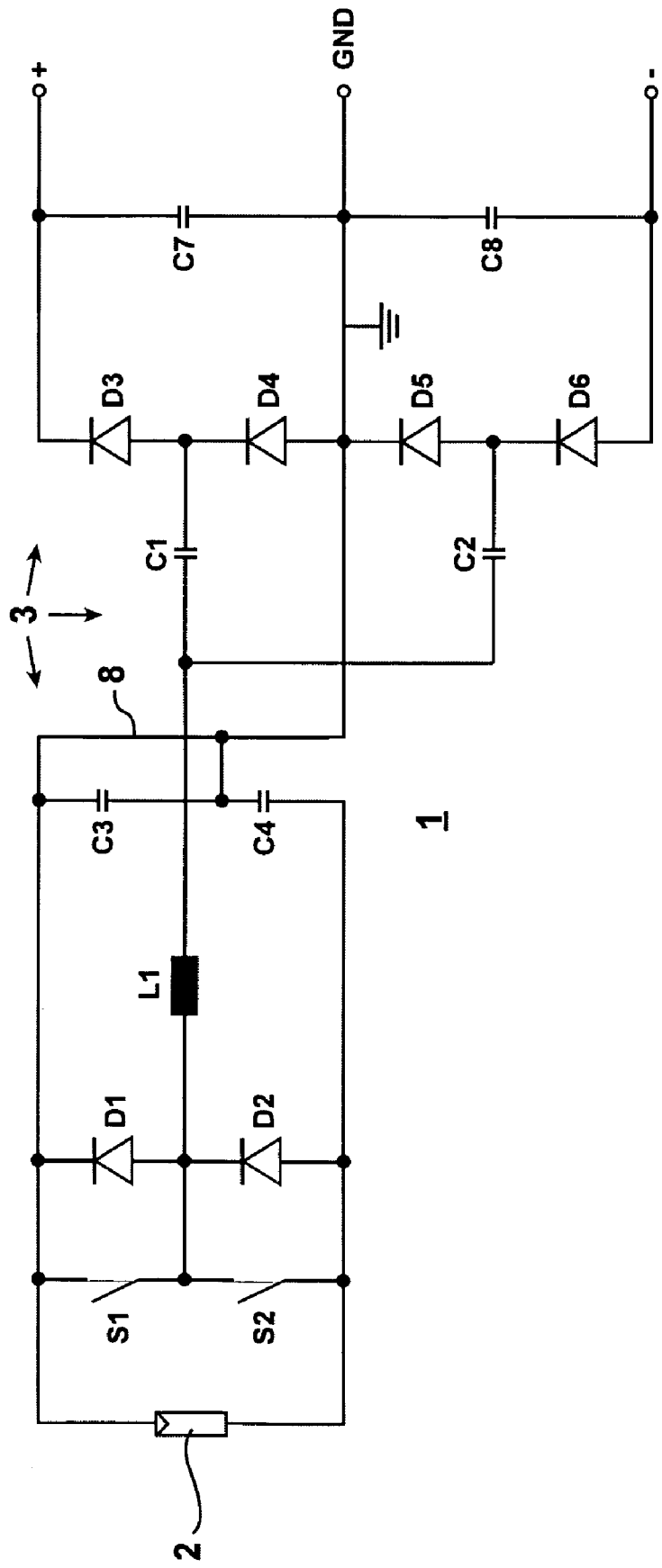
FIG. 3 shows a second exemplary embodiment of the DC-DC converter stage of the inverter of the invention in which a positive generator pole is grounded.

According to FIG. 3, the positive pole of the generator 2 may also be grounded. For this purpose, the capacitor C3 mounted at the positive pole must be short-circuited, which is illustrated by the line 8. For the rest, the circuit arrangement corresponds to the one described in FIG. 1.

Figure 4:
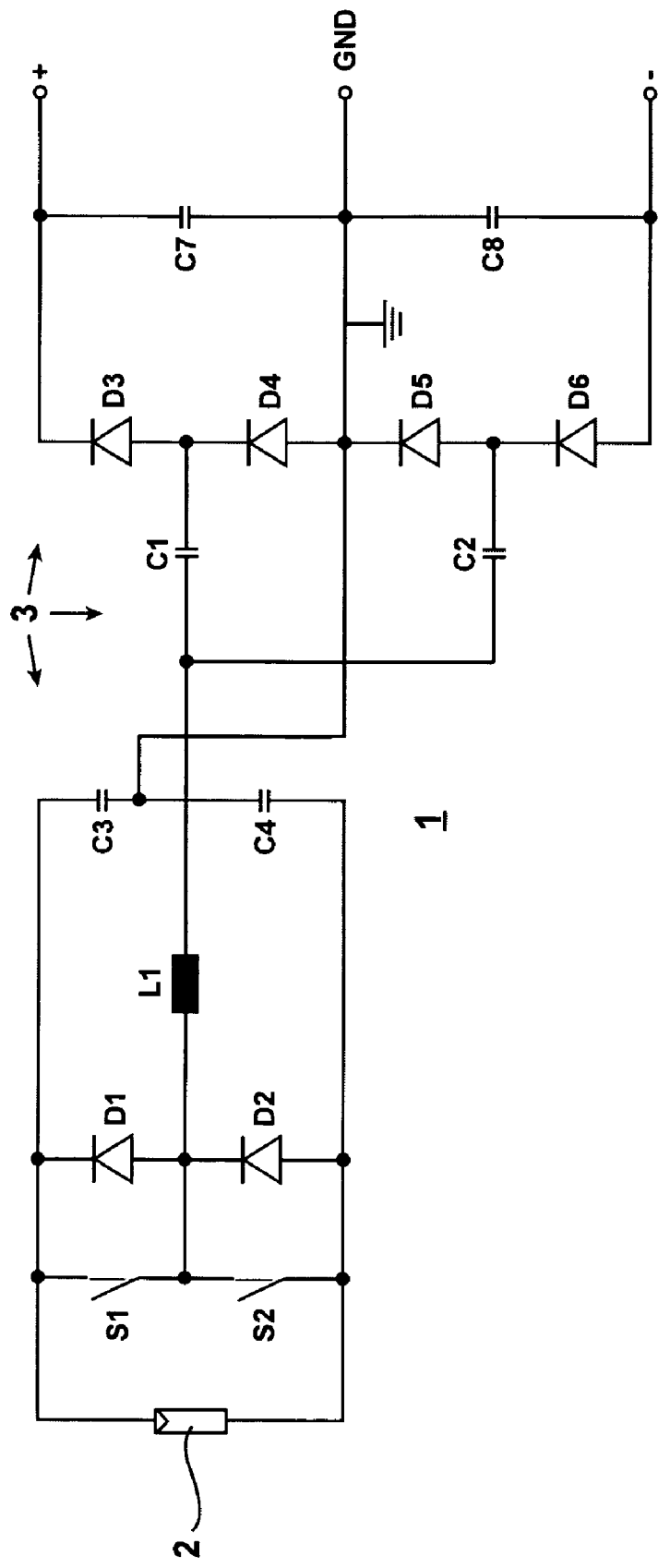
FIG. 4 shows a third exemplary embodiment of the DC-DC converter stage of the inverter of the invention in which the DC generator is virtually grounded centrally.

A variant in which the generator voltage is symmetrical to the ground potential (GND) is possible. This variant is shown in FIG. 4. The grounding point thereby is between the capacitors C3 and C4. It is thereby preferred that C3=C4. The capacitors C3 and C4 act as DC voltage dividers.

Figure 5:
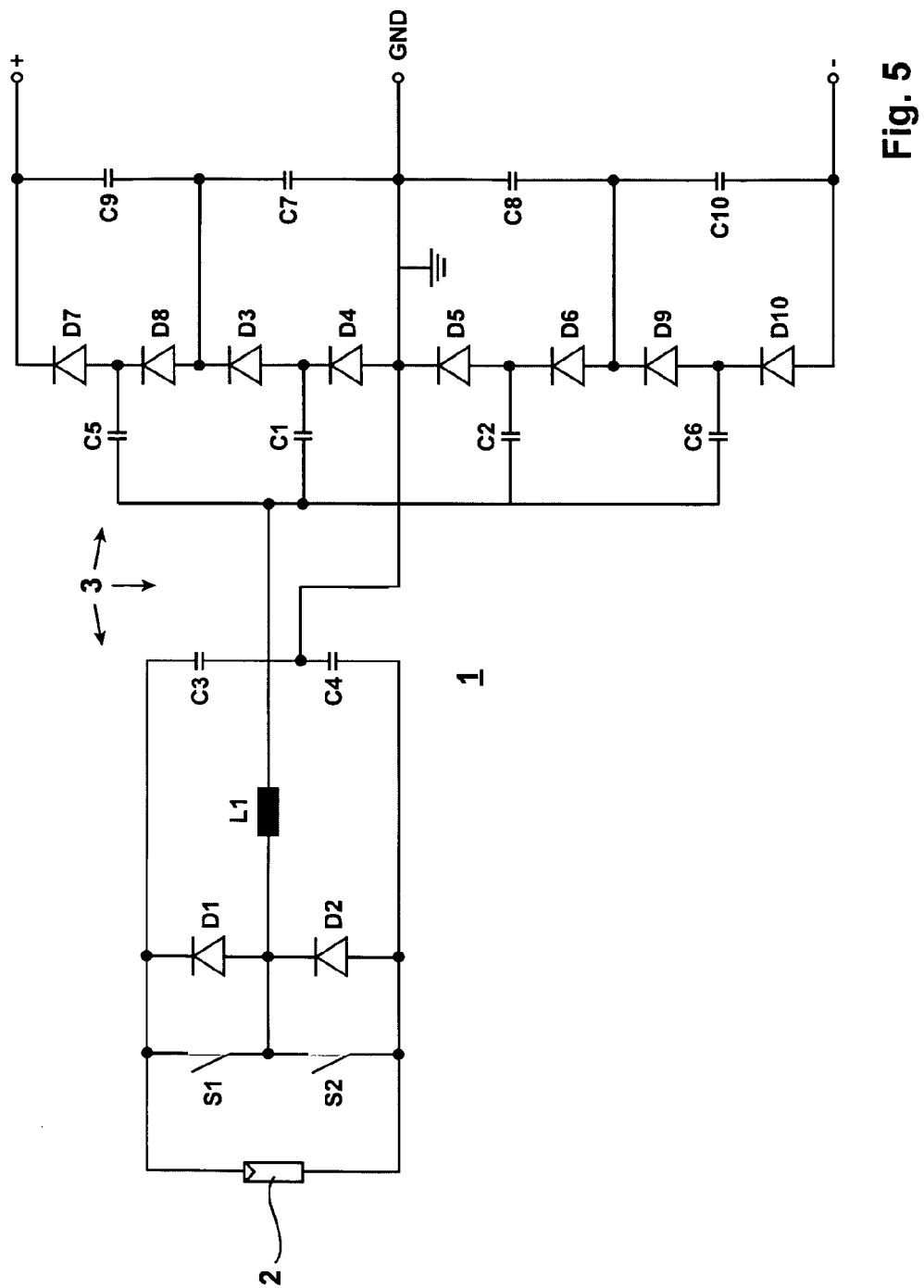
FIG. 5 shows a fourth exemplary embodiment of the DC-DC converter of the invention with an increased output voltage range.

In FIG. 5 there is shown an exemplary embodiment with four intermediate circuit capacitors C7; C8; C9 and C10, which are connected in series. As a result, the output voltage of the DC-DC converter can adopt values that are much higher than the output voltage supplied by the DC generator 2. In this way, the DC-DC converter of the invention can be scaled for different voltage ranges.

Through the series wiring of its output stages, the DC-DC converter of the invention has a "boosting effect" although the basic circuitry of "series compensated oscillating circuit inverters" only has a "stepdown behaviour" to begin with.

In the circuit shown in FIG. 5, 4 oscillating circuit capacitors C1, C2, C5 and C6 are provided, a rectifier consisting of the diodes D3, D4 or D5, D6 or D7, D8 or D9, D10 being connected downstream of a respective one of them. The 8 diodes D3, D4, D5, D6, D7, D8, D9 and D10 are connected in series. If the capacitors C1, C2, C5 and C6 have the same size, one has, in addition to GND potential (0 volt), four additional, evenly distributed voltage drops. The voltage drop over each of the capacitors C1, C2, C5 or C6 corresponds at most to the output voltage of the DC generator 2 as a matter of principle. Through the DC isolation of the various stages described, it is possible to widen it to higher voltage transformation values. FIG. 5 virtually shows four stages so that the DC generator voltage can be quadrupled.

Figure 6:
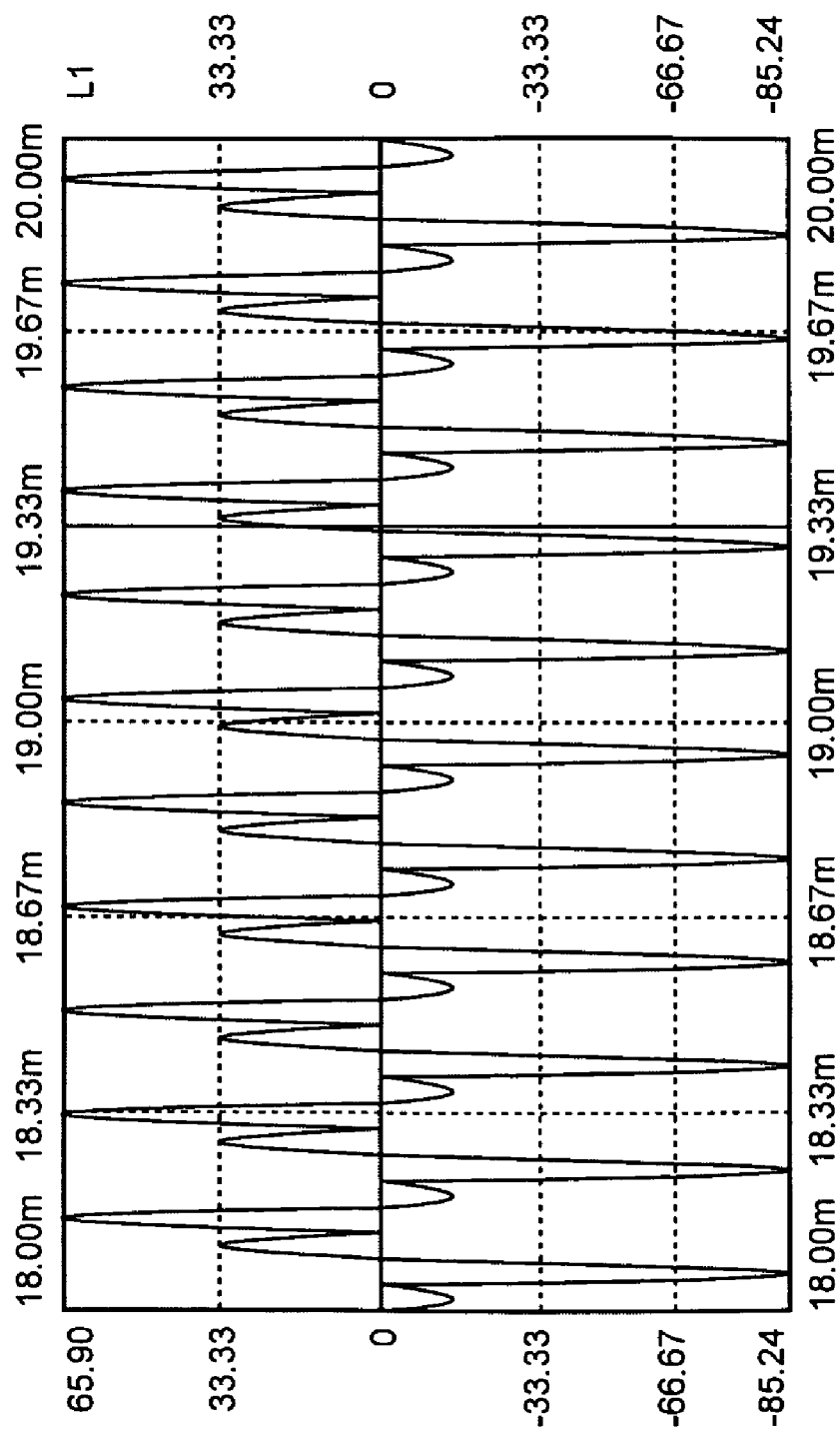
FIG. 6 shows a current curve of an oscillating circuit choke at a first high generator voltage.

A typical current flowing through the oscillating circuit inductance L1 is shown in FIG. 6 for the case of the current gap limit. In FIG. 6, the generator voltage is 700 volt. Once the switching element S1 has been switched on, the current starts to flow through the oscillating circuit formed by the choke L1 and the capacitors C1/C2. The current rise is limited by the choke L1. Through preferred dimensions of C1=C2, the current is distributed evenly enough over the intermediate circuit capacitors.

Figure 7:
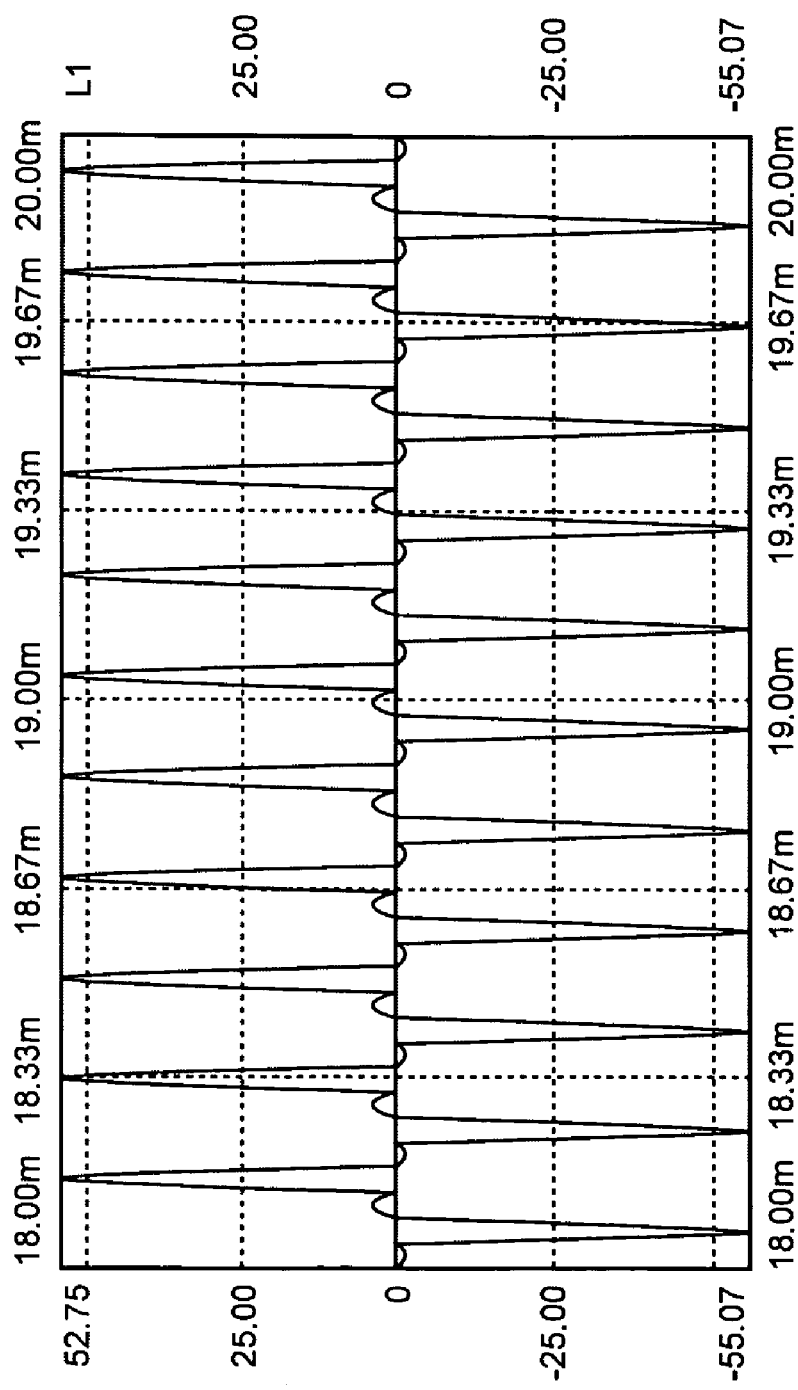
FIG. 7 shows a current curve of the oscillating circuit choke at a second, lower generator voltage.

After the conducting phase of the switching element S1 comes the conducting phase of the anti-parallel diode D1 through the current impression of the oscillating circuit. During this conducting phase, the switching element S1 can be virtually switched off at zero potential. If the oscillating circuit current through D1 reaches again zero, the current commutes downward with a slope substantially limited by the choke L1. This leads to drastic reduction of the reverse-recovery losses as compared to hard switching. FIG. 7 shows the current curve at the stability limit $U_{C7}=U_{C8}$.=generator voltage. The generator voltage thereby is 400 volt and the stability limit 350 volt.

We claim:

1. An inverter for a grounded direct voltage source, for converting the direct voltage into an alternating voltage with a DC-DC converter and a pulse inverter that is supplied by said DC-DC converter, said DC-DC converter being configured to be an oscillating circuit inverter and comprising a series resonant oscillating circuit, wherein said DC-DC converter is configured to be a series-compensated oscillating circuit inverter with a choke and a series-connected capacitor array comprising two or more oscillating circuit capacitors, a rectifier bridge branch including two diodes, is connected to each of the oscillating circuit capacitors, said rectifier bridge branch being connected with its positive or its negative pole to output side intermediate circuit capacitors which are connected in series so that said DC-DC converter delivers at least two bipolar output voltages such that the DC-DC converter is connected to a pulse inverter by a divided voltage intermediate circuit that is supplied from the oscillating circuit inverter.

2. The inverter as set forth in claim 1, wherein the oscillating circuit capacitors have the same capacitance.

3. The inverter as set forth in claim 2, wherein a plurality of voltage levels with the same polarity are provided by at least four oscillating circuit capacitors.

4. The inverter as set forth in claim 1, wherein two series-connected capacitors are connected in parallel to the direct voltage source as a DC intermediate circuit, a grounding point either is located between the two series-connected capacitors or is located at a positive pole of the source, while the capacitor connected to the positive pole being shorted or is located at a negative pole of the source, while the capacitor connected to the negative pole shorted.

5. The inverter as set forth in claim 1, wherein the DC-DC converter comprises two series-connected semi-conducting switching elements that are connected parallel to the direct voltage source, the oscillating circuit that comprises the choke and the capacitor array is connected with one end of the choke to the connection point in between the series-connected semi-conductor switching elements such that by alternate switching of the semi-conductor switching elements a positive and negative output current flows, respectively.

6. The inverter as set forth in claim 5, wherein the semi-conductor switching elements that are connected to the oscillating circuit are switched alternately at a high frequency.

7. The inverter as set forth in claim 1, wherein several voltage levels having the same polarity may be provided by at least four oscillating circuit capacitors.

8. A DC-DC converter having input terminals, output terminals, and an output ground terminal, comprising:
   a pair of series-connected switches connected between the input terminals of the DC-DC converter, wherein a first switch and a second switch of the pair are configured to open and close in an alternating fashion opposite one another;
   a series resonant oscillating circuit having an input connected to a midpoint connection of the pair of series-connected switches, and having two outputs;
   a first rectifier circuit coupled to a first of the two outputs of the series resonant oscillating circuit, and a second rectifier circuit coupled to a second of the two outputs of the series resonant oscillating circuit, wherein the first and second rectifier circuits couple together at a midpoint that is coupled to the output ground terminal of the DC-DC converter;
   an intermediate circuit comprising two series-connected capacitors connected between the output terminals of the DC-DC converter and in parallel with a combination of the first and second rectifier circuits, wherein the two series-connected capacitors of the intermediate circuit connect at a midpoint that is connected to the output ground terminal of the DC-DC converter.

9. An inverter configured to be coupled to a grounded direct voltage source, comprising:
   a DC-DC converter comprising input terminals configured to couple to respective poles of the grounded direct voltage source, and comprising output terminals having symmetrical outputs with respect to an output ground terminal;
   a DC-AC converter comprising input terminals coupled to the output terminals of the DC-DC converter, and comprising output terminals configured to be coupled to a grid, wherein one of the output terminals of the DC-AC converter is coupled to the output ground terminal of the DC-DC converter,
   wherein the output ground terminal of the DC-DC converter is coupled to one of the input terminals of the DC-DC converter or to an internal node of the DC-DC converter associated with a buffer capacitance therein, wherein the output terminals are symmetrical about the internal node.

10. The inverter of claim 9, wherein the DC-DC converter comprises:
   a pair of series-connected switches connected between the input terminals of the DC-DC converter, wherein a first switch and a second switch of the pair are configured to open and close in an alternating fashion opposite one another;

a series resonant oscillating circuit having an input connected to a midpoint connection of the pair of series-connected switches, and having two outputs;

a first rectifier circuit coupled to a first of the two outputs of the series resonant oscillating circuit, and a second rectifier circuit coupled to a second of the two outputs of the series resonant oscillating circuit, wherein the first and second rectifier circuits couple together at a midpoint that is coupled to the output ground terminal of the DC-DC converter;

an intermediate circuit comprising two series-connected capacitors connected between the output terminals of the DC-DC converter and in parallel with a combination of the first and second rectifier circuits, wherein the two series-connected capacitors of the intermediate circuit connect at a midpoint that is connected to the output ground terminal of the DC-DC converter.

11. The inverter of claim 10, wherein the DC-DC converter further comprises a pair of series-connected diodes connected in parallel to the pair of series-connected switches, and wherein a midpoint of the series-connected diodes is connected to the midpoint of the series-connected switches.

12. The inverter of claim 10, wherein the DC-DC converter further comprises a buffer capacitor connected in parallel with the pair of series-connected switches.

13. The inverter of claim 12, wherein the buffer capacitor comprises:
a pair of series-connected capacitors having a midpoint connected to the output ground terminal of the DC-DC converter; and
a shorting component selectively coupled across a first of the pair of series-connected capacitors of the buffer capacitor in a first configuration, thereby establishing a positive pole grounding of the direct voltage source when coupled thereto, or selectively coupled across a second of the pair of series-connected capacitors of the buffer capacitor in a second state, thereby establishing a negative pole grounding of the direct voltage source when coupled thereto.

14. The inverter of claim 12, wherein the buffer capacitor comprises:
a pair of series-connected capacitors having a midpoint connected to the output ground terminal of the DC-DC converter.

15. The inverter of claim 10, wherein the series resonant oscillating circuit comprises:
a choke having a first terminal connected to the midpoint connection of the pair of series-connected switches, and a second terminal;
a first capacitor having a first terminal connected to the second terminal of the choke, and a second terminal forming a first of the two outputs of the series resonant oscillating circuit; and a second capacitor having a first terminal connected to the second terminal of the choke, and a second terminal forming a second of the two outputs of the series resonant oscillating circuit.

16. The inverter of claim 9, wherein the DC-DC converter comprises:
a pair of series-connected switches connected between the input terminals of the DC-DC converter, wherein a first switch and a second switch of the pair are configured to open and close in an alternating fashion opposite one another;

a series resonant oscillating circuit having an input connected to a midpoint connection of the pair of series-connected switches, and having four outputs;

a first rectifier circuit coupled to a first of the four outputs of the series resonant oscillating circuit, a second rectifier circuit coupled to a second of the four outputs of the series resonant oscillating circuit, a third rectifier circuit coupled to a third of the four outputs of the series resonant oscillating circuit, and a fourth rectifier circuit coupled to a fourth of the four outputs of the series resonant oscillating circuit, wherein the first, second, third and fourth rectifier circuits couple together in series, and wherein the second and third rectifier circuits connect at a midpoint that is coupled to the output ground terminal of the DC-DC converter;

an intermediate circuit comprising four series-connected capacitors connected between the output terminals of the DC-DC converter and in parallel with a combination of the first, second, third and fourth rectifier circuits, respectively, wherein a midpoint of the four series-connected capacitors of the intermediate circuit is connected to the output ground terminal of the DC-DC converter.

17. The inverter of claim 16, wherein the series resonant oscillating circuit comprises:
a choke having a first terminal connected to the midpoint connection of the pair of series-connected switches, and a second terminal;
a first capacitor having a first terminal connected to the second terminal of the choke, and a second terminal forming a first of the four outputs of the series resonant oscillating circuit;
a second capacitor having a first terminal connected to the second terminal of the choke, and a second terminal forming a second of the four outputs of the series resonant oscillating circuit;
a third capacitor having a first terminal connected to the second terminal of the choke, and a second terminal forming a third of the four outputs of the series resonant oscillating circuit; and
a fourth capacitor having a first terminal connected to the second terminal of the choke, and a second terminal forming a fourth of the four outputs of the series resonant oscillating circuit.

* * * * *